June 2, 1931.  C. H. SHANNON  1,808,182
ELECTRICALLY OPERATED BRAKE FOR MOTOR VEHICLES
Filed Oct. 24, 1928    2 Sheets-Sheet 1
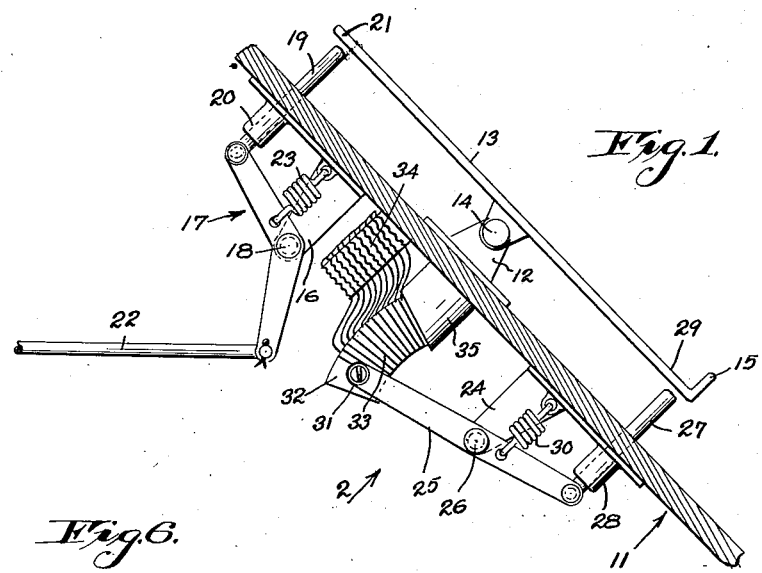
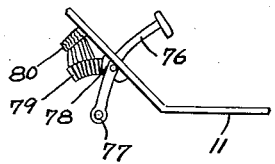
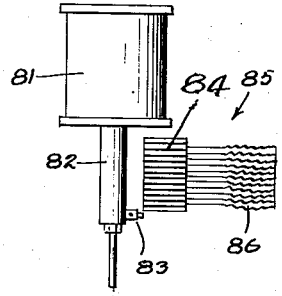
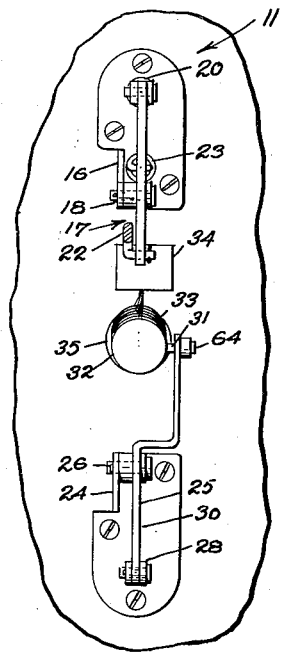
Inventor
C. H. Shannon
by Hazard and Miller
Attorneys.

June 2, 1931.  C. H. SHANNON  1,808,182
ELECTRICALLY OPERATED BRAKE FOR MOTOR VEHICLES
Filed Oct. 24 1928    2 Sheets-Sheet 2

Inventor
C. H. Shannon
by Hazard and Miller
Attorneys

Patented June 2, 1931

1,808,182

UNITED STATES PATENT OFFICE

CARSON H. SHANNON, OF LOS ANGELES, CALIFORNIA, ASSIGNOR TO AMERICAN ELECTRIC BRAKE CORPORATION, OF LOS ANGELES, CALIFORNIA, A CORPORATION OF DELAWARE

ELECTRICALLY OPERATED BRAKE FOR MOTOR VEHICLES

Application filed October 24, 1928. Serial No. 314,597.

My invention is an electrically operated brake for motor vehicles.

An object of my invention is the construction of an electrically operated brake for motor vehicles which may be readily controlled by a foot pedal brake control device and in which the action of the electrically applied brake will be substantially the same as a mechanically applied brake, that is, the greater pressure the operator exerts on the foot pedal, the greater will be the electrical braking power on the wheel.

Also a feature of my invention in this connection is that the electrical braking power is substantially proportional to the distance of movement of the foot pedal or other control device. That is, with a slight movement of such control device the brake is only slightly applied and with increased movement the brake is applied with increased force.

A further object of my invention is the construction of an electrically operated and controlled brake which will not jam on the brakes too hard on the initial impulse but which will first give a gentle braking action and this may gradually be increased up to the maximum, the pressure being absolutely under the control of the operator.

A more detailed object of my invention is an electrically operated brake in which the brake applying force is through the medium of a solenoid or the equivalent and in which the electrical current energizing the solenoid is controlled whereby as the armature is drawn further into the solenoid the electrical current is automatically reduced, thereby preventing a too quick application of the brakes.

In this connection, a further object of my invention is to manually control the current by a control device actuated by the operator to increase the current in the solenoid when increased braking is required in order to generate the maximum power for hard and severe braking or any graduation of power between this and the slight application of the brakes.

A further object of my invention in an electric brake operated by a solenoid or the equivalent, is in the connection of a ballast resistance in the circuit of the solenoid whereby when the solenoid is first energized, substantially full current will be passed therethrough, drawing the armature in the coil. Then on account of the attractive force being much increased by the lesser gap in the coil, a resistance is automatically cut into the solenoid circuit, thereby reducing the current through the solenoid, this reduction being such as to prevent a complete inward movement of the armature and thus preventing a jamming of the brakes by the full application of the electrical power.

In connection with this feature, a further object of my invention is a manual control having a graduated resistance or rheostat preferably controlled by the movement of the foot pedal, this resistance being interlinked with the resistance of the solenoid circuit and of an operating lever connected thereto. By this construction the circuit would normally be de-energized when the brakes are off and when the control is first operated it closes the circuit, transmitting a current to the solenoid substantially without any resistance therein. The first action is to take up slack in the brakes and overcome the springs holding the brake bands clear of the drum and applying a gentle pressure to the drum. The foot pedal control then may be used for increased pressure.

A further object of my invention is the linking of the foot pedal electrical brake control with the throttle control of the engine, whereby the operator controls the throttle and the brake with the same foot pedal, rocking this pedal in one direction or the other. For instance, by depressing the toe he may actuate and control the throttle and by raising the toe and depressing the heel he can control the brakes. This feature eliminates the loss of time between an operator removing his foot from the ordinary accelerator and applying the brakes and at fast travel, now quite common, the fraction of a second to shift the foot is an important factor in quick braking.

In constructing my invention I preferably utilize a rocking type of foot pedal pivoted at its mid length so that the heel can rest at the lower end and the toe at the upper end. When the toe is depressed it operates a plunger controlling the throttle. In the neutral position neither the throttle nor the brake are in operation, but when the toe is raised and the heel depressed a control lever is actuated for the electrical mechanism.

This lever has a spring to normally retract it into the inoperative position. The lever is part of an electrical circuit from a source of power such as a battery and has a brush sweeping over either a resistance or a commutator connected to a resistance. The brake applying solenoid has a movable armature therein. This armature is connected to a pivoted lever, the armature lever being in the electric circuit of the solenoid and having a brush adapted to sweep over a resistance or commutator having a resistance. The solenoid lever also applies the brakes.

The electrical connections are from the first position of the control rheostat or resistance to the first position of the solenoid rheostat or resistance. There is also an electrical connection from the end or through the whole control resistance to the solenoid. By this construction when the control lever is moved to the initial position a current is transmitted to the first position of the solenoid rheostat through the solenoid lever direct to the solenoid, thus giving a maximum current. This causes the armature to be drawn in and as the armature is connected to the resistance lever, it sweeps this lever over the solenoid resistance increasing such resistance and thereby reducing the current and limiting the inward pull on the armature. The above action overcomes the initial resistance of the brake, taking up the slack and giving a slight pressure. When it is desired to increase the brake pressure the foot pedal is further depressed, shifting its control lever over the control rheostat. This is connected to the operating rheostat and to the solenoid so that there is practically a direct current without resistance to the operating rheostat and hence to the solenoid and this is gradually cut out so that there is a direct current without resistance to the solenoid. The latter gives practically a full brake pressure.

A further detailed object of my invention is to use the solenoid type of brake applying mechanism mounted upon the brake drum of a wheel, whereby there is an individual electrical braking device for each wheel and manifestly this may be applied to all four wheels of a vehicle. However, if desired the solenoid may be connected to the ordinary braking mechanism such as is more or less standard in different vehicles having mechanical braking and thereby apply the brakes.

My invention is illustrated in the accompanying drawings, in which;

Figure 1 is a side elevation of the foot pedal control mechanism for the throttle and the electrical circuits;

Fig. 2 is an underneath view taken in the direction of the arrow 2 of Fig. 1;

Fig. 6 is a diagram illustrating my brake control as applied to an ordinary brake pedal;

Fig. 7 is a diagram showing the resistance in the solenoid circuit of the brakes controlled directly by the armature of the solenoid.

Figure 3:
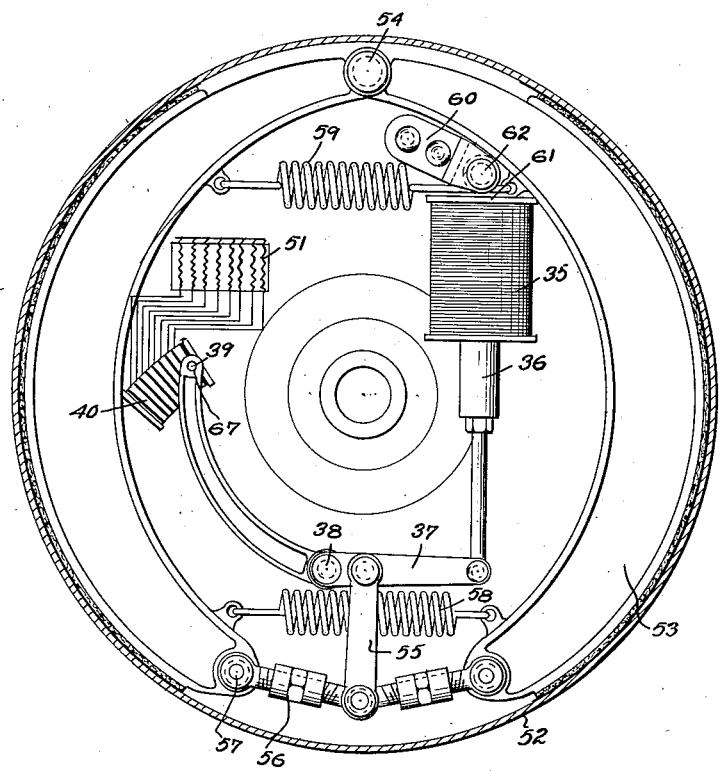
Fig. 3 is a side elevation partly in section of the electric brake applying mechanism, showing an installation in a brake drum.

The control mechanism of Figs. 1 and 2 utilizes a floor board 11 having a bracket 12 mounted thereon and on this bracket a foot pedal 13 is pivoted by the pivot pin 14. This pedal has a flange 15 to engage the heel. A bracket 16 depends from the floor board and has a bell crank 17 connected thereto by the pivot 18. A plunger 19 slides through a guide 20 and is adapted to be engaged by the toe portion 21 of the pedal. This bell crank operates a link 22 connected to the throttle of the engine. A spring 23 normally retracts the plunger and the link.

The brake control comprises a bracket 24 depending from the floor board and having a control lever 25 pivotally mounted thereon by the pivot 26. This lever has a plunger 27 at one end operating through a guide 28, the plunger being adapted for engagement by the heel portion 29 of the pedal 13. A spring 30 normally retracts the plunger and the lever. The lever has a brush 31 thereon which in the normal operation rests on an insulating base 32 of a commutator 33. This commutator has its segments connected to a resistance 34, the commutator and resistance forming a rheostat. The commutator is mounted on a base 35 on the underside of the floor board. It will be seen that any other suitable type of rhesotat may be utilized in which the brush operates to cut in and cut out resistance.

The brake applying mechanism such as illustrated in Fig. 3 utilizes a solenoid 35 this having an armature 36 moving in and out of the solenoid coil. The armature is connected to a solenoid lever 37 mounted on the pivot 38. One end of this lever has a brush 39 adapted to sweep over a commutator 40, this commutator having a resistance 51 in circuit with the segments. If desired any other suitable type of rheostat may be utilized in which the movement of the brush cuts in and cuts out resistance.

The mechanical features of the brake utilizes a brake drum 52 with brake shoes 53 mounted on a pivot 54, being adapted to press thereagainst. A link 55 is connected to the lever 37 and this link is connected to adjustable toggle links 56, these links being connected to the ends of the shoes as indicated in 57. Springs 58 and 59 connected between the shoes normally tend to retract same. The mounting of the solenoid utilizes a bracket 60 secured in a fixed position, the base 61 of the solenoid having a connection by a pivot 62 to this bracket to allow slight oscillating movement of the solenoid.

Figure 4:
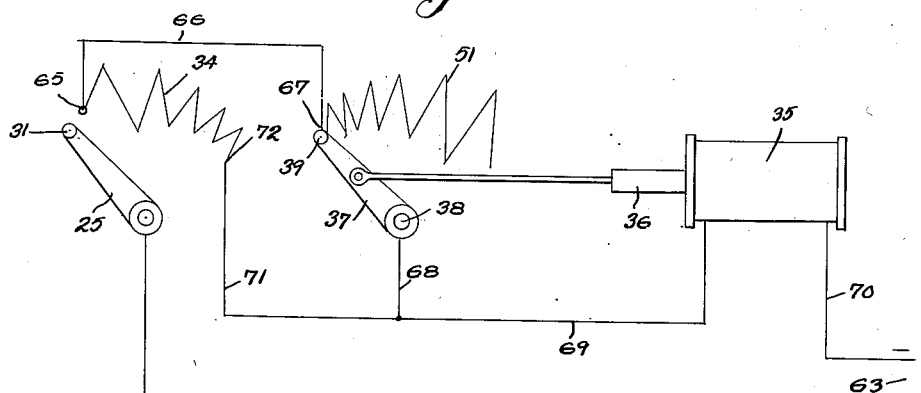
Fig. 4 is an electrical diagram of the circuits.

The electrical circuits are substantially as follows, having reference to Fig. 4.

The source of power such as the battery, is indicated at 63 and its lead 64 to the control lever 25. Such lever may be attached directly to one end of the brush 31. This lever is indicated in its normal position when the brakes are free, that is, there is an open circuit between the brush 31 and the resistance 34. As soon as the heel portion of the foot pedal 13 is depressed the lever 25 is moved to the position 65 and a current passes through the lead 66 to the first end 67 of the resistance 51. The current passes through the brush 39 and by the lever 37 and the connections 68 and 69 to the solenoid 35 and back to the source of power by the leads 70.

It will be seen therefore that electrical power is applied first with a minimum resistance, thus energizing the solenoid 35 to the full extent and causing an initial inward pull on the armature 36 and as the armature is pulled inwardly the lever 37 cuts in the resistance 51. As this resistance is cut in by the brush 39 the current through the solenoid 35 is reduced, this being a ballast resistance and prevents the armature from being drawn into its full extent with an increased power due to the decreased air gap in the solenoid and a balance will be obtained giving a gentle braking action.

The resistance 34 is constructed so the first movement of the lever 25 causes a considerable resistance and this rapidly decreases per unit of movement of the lever 25, whereas the coil 51 starts with a small resistance and rapidly increases per unit of travel of the lever 37. The moving of the lever 25 over the resistance 34 therefore graduates the current energizing the solenoid, giving an increased braking power substantially in proportion to the depression of the heel of the foot pedal. This effects a natural action as the depression of the foot pedal is done against an increasing spring resistance having a characteristic similar to the present mechanical or hydraulic brake applications.

When it is desired to obtain a maximum application of the brakes the heel of the foot pedal is depressed to its full extent, shifting the lever 25 with the brush 31 to the end 72 of the resistance 34. This then gives a circuit direct to the lead 71 and 69 to the solenoid substantially without resistance, as the parallel circuit through the leads 66, 67 and the resistances 51, 68 and 69 will be so great that but very little current will travel in this path.

The mechanism illustrated in Fig. 3 for actuating the brakes of each wheel substantially directly by the solenoid is intended to be an illustration of an operative mechanism and not binding to any particular mechanism. Also it is obvious that the solenoid may be housed either in the drum or outside of the brake drum on a convenient mounting. There are also a number of mechanical brake shoe operating devices with which the solenoid could be utilized to actuate besides the toggle type of mechanism illustrated in Fig. 3.

Figure 5:
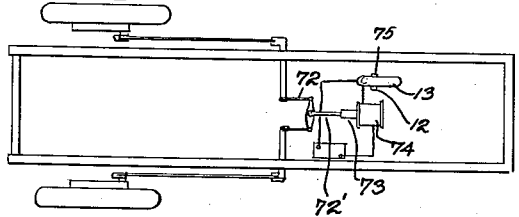
Fig. 5 is a diagram showing my electrical operation of standard mechanical braking systems.

In Fig. 5 I illustrate a diagram of my equipment applied to a standard braking mechanism. In this case an equalizer device is indicated by the numeral 72 and an extension 72' in the armature 73 of the solenoid 74 is attached. This solenoid is controlled by a foot pedal device 75 in the manner above described in connection with the solenoid control and operation as described in connection with Figs. 1 through 4. It is obvious in this case that the single solenoid must have sufficient power to operate the mechanical braking equipment. This illustrates a construction which may be utilized with present vehicles by changing the operating device to the solenoid from that at present in use. It is obvious also that a construction such as shown in Fig. 5 may be utilized on four wheel brakes.

In Fig. 6 I show my invention for a control as applied to an ordinary brake pedal and in this case a pivoted pedal is indicated at 76 having its pivot at 77, this being of ordinary type. The pedal in its movement has a brush 78 operating over the commutator 79, the commutator having the resistance 80 and forming a rheostat. This construction adapts the control features of my invention to be utilized with present vehicles.

In Fig. 7 I show a modified solenoid ballast resistance control, in which the solenoid is designated by the numeral 81 having an armature 82. This armature has a brush 83 directly connected thereto which operates over the commutator 84 of the rheostat 85, this rheostat having resistances 86.

A connection such as shown in Fig. 7 is suitable for use in the construction shown in Fig. 5 as well as other mechanical connections from the armature of the solenoid to the braking mechanism.

From the above description it will be seen that I have developed a general apparatus for the control and actuation of brakes utilizing electrical power which may have many adaptations and many types of installations. It will also be seen that I have developed a method of applying brakes that is, by a method of controlling electric current operating on an electro-magnetic device such as a solenoid in which the initial current may be applied to set the brakes and by means of a ballast resistance the jamming of the brakes may be prevented and the full braking application may be made by operation of a control resistance.

A characteristic feature of my invention is that in the first application of the brakes by depressing the foot pedal, a current is transmitted substantially direct to the solenoid giving a quick and energizing action which takes up any slack in the brake system and overcomes the springs holding the brake shoe out of engagement with the brake drums or the equivalent and applies a gentle braking pressure. This light braking pressure comes to a balance due to the action of the ballast for operating resistance being drawn into the solenoid circuit. If a graph of forces and movement of the brakes were drawn, this would practically show a straight line curve. An increase of the brake pressure is caused by the proper use and bringing into action of a suitable control resistance in connection with a suitable operating or ballast resistance, this latter being controlled by the armature movement. These are designed so that the graph of the force and distance movement of the brakes gives an upward curve, the pressure of the brakes being rapidly increased in proportion to a movement of the solenoid armature.

While I have illustrated by diagrams suitable types of resistances and connection thereto to effect the above action, it is to be understood that the resistances may be of any suitable character and their values may be mathematically computed to give the desired result.

While I have illustrated my solenoid and the control thereof arranged to apply brakes for a vehicle it will be apparent that such solenoid and a similar control may be utilized for other purposes. The brake, in effect, is a power applying device, that is, a means for applying power, and the solenoid controlled in the manner described may be used for operating many types of movable means which apply power or cause the application of mechanical power.

Various changes may be made in the principles of my invention without departing from the spirit thereof as set forth in description, drawings and claims.

I claim:

1. In an electrically operated brake, an electro-magnetic device having means to operate brakes, and a control mechanism actuated by said device to control the power thereof.

2. In an electrically operated brake as claimed in claim 1, a manually operated circuit controller controlling the circuit for the electro-magnetic device to energize said device mainly by a circuit under control by the control mechanism.

3. In an electric brake, an electro-magnetic device having a movable element adapted to actuate brakes, a circuit for said device and a control mechanism for said circuit regulated by the movement of the movable element.

4. In an electric brake as claimed in claim 3, a manually operated control device adapted to transmit the major portion of a current either through the said control mechanism or direct to the electro-magnetic device.

5. In an electrically operated brake, an electro-magnetic device having a winding, a circuit for said winding including an operating regulatable rheostat, a movable element actuated by the energizing of the said winding and means operated by the movement of said element to regulate the operation of the rheostat and thereby the current energizing the winding.

6. In an electrically operated brake as claimed in claim 5, a manually operable control rheostat, a circuit connecting said rheostat with the operating rheostat of the electro-magnetic device and another circuit connecting the control rheostat directly with the electro-magnetic device.

7. In an electrically operated brake, a solenoid having a movable armature, an operating controlling device in the circuit of the solenoid, means to operate said control device by the movement of the armature, whereby the energizing current is regulated by the relative position of the armature and the winding of the solenoid.

8. In an electrically operated brake, a solenoid having an armature with means to operate brakes by movement of the armature, an operating control device in circuit with the windings of the solenoid, means operated by the movement of the armature to regulate the control device, whereby the energizing of the solenoid is regulated by the relative position of the armature and the windings of the solenoid, a manually operated control mechanism and a circuit from said mechanism to the control device for the solenoid and substantially directly to the windings of the solenoid.

9. In an electrically operated brake, a solenoid having a winding with an armature operating in relation thereto, the armature being adapted to actuate brakes, an operating rheostat connected in the circuit of said winding, means to regulate said rheostat by the movement of the armature, whereby the energizing of the winding is regulated by the position of the armature in relation to such winding.

10. In an electrically operated brake, a solenoid having a winding with an armature operating in relation thereto, the armature being adapted to actuate brakes, an operating rheostat connected in the circuit of said winding, means to regulate said rheostat by the movement of the armature, whereby the energizing of the winding is regulated by the position of the armature in relation to such winding, a manually controlled rheostat having a circuit in two branches, one branch being connected to the operating rheostat in the solenoid circuit and having a second connection substantially direct to the solenoid whereby in effect the main energizing current may be transmitted direct to the winding of the solenoid, the smaller parallel current being transmitted through the resistance of the control rheostat and the resistance of the operating rheostat.

11. In an electrically operated brake, a solenoid having a winding and an armature, a core movable in relation thereto, means to apply brakes actuated by the armature, an operating resistance in circuit with the solenoid winding, an energized brush operated by the armature and shiftable to different positions in relation to said resistance, whereby on movement of the armature inwardly in the winding an increased resistance is placed in the circuit of the winding.

12. In an electrically operated brake as claimed in claim 11, a control resistance having an energized brush adapted in movement to energize all or part of the control resistance, an electrical connection from the leading end of the control resistance to the leading end of the operating resistance, and a connection from the trailing end of the control resistance to the winding of the solenoid, whereby the manual control resistance may control the current to the solenoid winding.

13. In an electrically operated brake, a brake drum having brake shoes to cooperate therewith, a solenoid having a winding and a movable armature, the solenoid being mounted adjacent the drum and the armature having a connection to operate the shoes, an operating rheostat in circuit with the winding, a brush operated by the armature controlling the rheostat to regulate the current through the winding, a manual control having a rheostat with an energized brush operating in connection therewith, the control rheostat having a circuit leading to the operating rheostat and another circuit leading directly to the solenoid winding.

14. In an electric brake, a brake drum having brake shoes, a solenoid having a winding supported inside the drum, the armature of the solenoid having an operative connection to the brake, an operating rheostat in circuit with the winding, means to control said rheostat by the movement of the armature.

15. In the method of controlling electric brakes comprising energizing an electro-magnetic device to initially apply the brakes, introducing a ballast resistance to the circuit of the electro-magnetic device to restrain complete action of said device, and subsequently for an increased application of the brakes transmitting current substantially direct to the electromagnetic device.

16. In the method of operating brakes, utilizing a solenoid having an armature operatively connected to the brakes, first transmitting an energizing current substantially direct to the winding of the solenoid, in the application of the brakes introducing a ballast resistance into the circuit of the solenoid winding to decrease the power of the solenoid and to control the increase of the braking power, substantially cutting out the ballast resistance and transmitting a current mainly directly to the winding of the solenoid.

17. In the method of operating electric brakes, utilizing a solenoid having a winding and an armature operatively connected to the brakes, utilizing also a ballast resistance in circuit with the solenoid winding and a control resistance in parallel with the ballast resistance and with the solenoid winding, first transmitting current substantially directly to the solenoid winding without passing through the control or the ballast resistance, on the partial application of the brakes passing the energizing current through part of the ballast resistance and thereby decreasing the power of the solenoid and to obtain an increased power of the brakes transmitting current partly through the control resistance and the ballast resistance to the solenoid and by a parallel circuit through part of the control resistance direct to the solenoid and for a complete brake application transmitting substantially all of the current direct from the source of power to the solenoid winding.

18. In the method of controlling electric brakes comprising energizing an electro-magnetic device having a moving element to initially apply the brakes, causing such element to introduce a ballast resistance in the circuit of the electro-magnetic device to effect a balance of electrical forces and brake actuating forces, and subsequently by control of a second resistance increasing the current through the electro-magnetic device to increase the mechanical brake applying forces in substantial proportion to the increase of the electromagnetic forces.

19. In an electrically operated brake, an electro-magnetic device, means operatively connected to said device adapted to operate brakes, a first control means to regulate the energizing of the electro-magnetic device and electrical means controlled by the electromagnetic device to regulate the energizing thereof, whereby a gradual or rapid application of the brakes may be effected in accordance with the operation of the first control means.

20. In an electrically operated brake, an electro-magnetic device, means operatively connected thereto adapted to operate brakes, a first and a second circuit partly in parallel to energize said device, a first control means for the first circuit, adapted to initially energize the said device through the second parallel circuit, a second control means operated by the electro-magnetic device, to control the operation of said device and hence the application of the brakes, the further operation of the first control means being adapted to substantially energize the electro-magnetic device through the first parallel circuit, the second control means operated by the electro-magnetic device substantially cutting out the current through the second parallel circuit.

21. In an electrically operated brake, an electro-magnetic device, means operatively connected thereto adapted to operate brakes, a first and a second parallel circuit electrically connected to the electro-magnet device, each circuit having an adjustable resistance, a first manually controlled means for the first resistance, adapted to initially energize the electro-magnetic device through the second parallel circuit, a second automatically controlled means operatively connected to the electro-magnetic device, to increase the resistance in the second circuit and thereby control the operation of the electro-magnetic device and the applying of the brakes, the further operation of the first and manually controlled means being adapted to decrease the resistance in the first parallel circuit, whereby the major portion of the current energizing the electro-magnetic device travels by the first parallel circuit, the said second control means being adapted on substantially full operation of the first control means to increase the resistance in the second parallel circuit to such an extent as to substantially cut out the current passing through the said second circuit.

22. In an electrically operated brake, an electro-magnetic device, means operatively connected thereto adapted to operate brakes, a first and a second parallel circuit, each having a resistance, a first control means for the resistance of the first circuit, adapted when the brakes are free to have an open circuit, the initial closing of the circuit by the said first means being adapted to transmit a current through a second control means for the resistance of the second circuit, said second control means in its initial position being adapted to transmit current to the electro-magnetic device without passing through the said second resistance, an interconnection between the electro-magnetic device and the second control means to operate said latter means, whereby the resistance in the second circuit is increased until the re- action of the brakes and the current through the electro-magnetic device stops the movement of the second control means, the further movement of the first control means being adapted to decrease the resistance of the first parallel circuit, and increase the resistance of the second parallel circuit and on full movement of the first control means the electro-magnetic device being adapted to move the second control means to increase the resistance of the second circuit substantially to a maximum.

23. In an electrically operated brake, an electro-magnetic device, an operative connection from said device to operate brakes, an electric circuit to energize said device, having a variable resistance and control means for said resistance operatively connected to said electro-magnetic device, whereby said control element on energizing of the said device increases the resistance in the said circuit and thereby controlling the energizing of said electro-magnetic device and the application of the brakes.

24. In an electrically operated brake as claimed in claim 23, a circuit in parallel to the first circuit having a resistance with a manual control element therefor, said manual control element being adapted to decrease the resistance in the said latter circuit, thereby energizing the electro-magnetic device to such an extent that the control means operated by said device increases the resistance of the first mentioned circuit.

25. In the method of controlling electric brakes, comprising energizing an electro-magnetic device with current through parallel circuits, automatically increasing the resistance in one of said circuits until a stabilized condition is obtained in the energizing of said device and the application of the brakes, manually decreasing the resistance in the other parallel circuit to energize the electro-magnetic device mainly through the said latter circuit.

26. In the method of controlling electric brakes comprising energizing an electro-magnetic device operatively connected to the brakes by a manual control of parallel circuits, the initial current passing mainly through the second branch of said parallel circuits to the electro-magnetic device, said electro-magnetic device in its operation of applying the brakes causing a decrease of the current through the second branch of the parallel circuit, then for further application of the brakes increasing the current through the first branch of the parallel circuits until the electro-magnetic device is mainly energized through said first branch.

27. In the method of controlling electric brakes as claimed in claim 26, and in a further step causing the electro-magnetic device to increase the resistance in the second branch of the parallel circuit to such an extent that the energizing current passes mainly through the first branch of said parallel circuit.

28. In the method of controlling electric brakes comprising energizing an electromagnetic device operatively connected to brakes through control of circuits in parallel, the first circuit being manually controlled and the second circuit being automatically controlled by the inter-connection with the electro-magnetic device, closing the first circuit and causing the energizing current of the electro-magnetic device to initially pass mainly through the second circuit, increasing the resistance in the second circuit under the control of the electro-magnetic device until a stabilized condition is obtained between the energizing of the electro-magnetic device and the application of the brakes, manually decreasing the resistance from the first branch of the parallel circuit until the current passes mainly through the first branch to the electro-magnetic device, and causing said electro-magnetic device to increase the resistance in the second circuit.

29. The combination of an electro-magnetic device having a movable element adapted to actuate a power applying means, a circuit for said device, and a control mechanism for said circuit regulated by the movement of the movable element, a manually operated control device adapted to transmit the major portion of a current either thru the control mechanism or direct to the electro-magnetic device.

30. The combination of an electro-magnetic device having a winding, a circuit for said winding including an operating regulatable rheostat, a movable element actuated by the energizing of the said winding and means operated by the movement of said element to regulate the operation of the rheostat and thereby the current energizing the winding, a manually operable control rheostat, a circuit connecting said rheostat with the operating rheostat of the electro-magnetic device and another circuit connecting the control rheostat directly with the electro-magnetic device.

31. The combination of a solenoid having an armature with means to operate a power applying device by the movement of the armature, an operating control device in circuit with the windings of the solenoid, means operated by the movement of the armature to regulate the control device, whereby the energizing of the solenoid is regulated by the relative position of the armature and the windings of the solenoid, a manually operated control mechanism and a circuit from said mechanism to the control device for the solenoid and substantially directly to the windings of the solenoid.

32. The combination of an electro-magnetic device, means operatively connected to said device adapted to operate a power applying means, a first control means to regulate the energizing of the electro-magnetic device, an electrical means controlled by the electro-magnetic device to regulate the energizing thereof whereby a gradual or a rapid application of the power applying means may be effected in accordance with the operation of the first control means.

33. In the method of controlling the application of mechanical power comprising energizing an electro-magnetic device to initially apply the mechanical power introducing a ballast resistance to the circuit of the electro-magnetic device to restrain complete action of said device and subsequently, for an increased application of the mechanical power transmitting current substantially directly to the electro-magnetic device.

34. In the method of controlling the application of mechanical power, utilizing a solenoid and having an armature operatively connected to mechanically apply power, first transmitting an energizing current substantially directly to the winding of the solenoid, in the application of the mechanical power introducing a ballast resistance into the circuit of the solenoid winding to decrease the power of the solenoid and to control the increase of the application of the mechanical power, subsequently cutting out the ballast resistance and transmitting a current mainly directly to the winding of the solenoid.

35. In the method of controlling the application of mechanical power comprising energizing an electro-magnetic device having a moving element to initially apply mechanical power, causing such element to introduce a ballast resistance in the circuit of the electrical device to effect a balance of the electrical forces and the mechanically actuating forces, and subsequently by control of a second resistance increasing the current thru the electro-magnetic device to increase the mechanical power applying forces in substantial proportion to the increase of the electro-magnetic forces.

36. In the method of controlling the application of mechanical power comprising energizing an electro-magnetic device with current thru parallel circuits, automatically increasing the resistance in one of said circuits until a stabilized condition is obtained in the energizing of said device and the application of mechanical power, manually decreasing the resistance in the other parallel circuit to energize the electro-magnetic device mainly thru said latter circuit.

In testimony whereof I have signed my name to this specification.

CARSON H. SHANNON.